(12) United States Patent
Cao et al.

(10) Patent No.: US 9,923,834 B2
(45) Date of Patent: Mar. 20, 2018

(54) SYSTEM AND METHOD FOR TRIGGERING AND SENDING DEVICE-TO-DEVICE BUFFER STATUS REPORT AND SCHEDULING REQUEST

(71) Applicant: Futurewei Technologies, Inc., Plano, TX (US)

(72) Inventors: Zhenzhen Cao, Beijing (CN); Jie Ma, Beijing (CN); Yongqiang Gao, Beijing (CN); Mazin Al-Shalash, Frisco, TX (US)

(73) Assignee: Futurewei Technologies, Inc., Plano, TX (US)

( * ) Notice: Subject to any disclaimer, the term of this patent is extended or adjusted under 35 U.S.C. 154(b) by 171 days.

(21) Appl. No.: 14/708,233

(22) Filed: May 9, 2015

(65) Prior Publication Data

US 2015/0326484 A1 Nov. 12, 2015

Related U.S. Application Data

(60) Provisional application No. 61/991,305, filed on May 9, 2014.

(51) Int. Cl.
| | |
|---|---|
| *H04W 4/00* | (2009.01) |
| *H04L 12/835* | (2013.01) |
| *H04W 72/12* | (2009.01) |
| *H04W 74/08* | (2009.01) |
| *H04W 74/00* | (2009.01) |
| *H04L 12/64* | (2006.01) |
| *H04W 4/02* | (2018.01) |

(52) U.S. Cl.
CPC .......... *H04L 47/30* (2013.01); *H04L 12/6418* (2013.01); *H04W 4/005* (2013.01); *H04W 4/023* (2013.01); *H04W 72/1205* (2013.01); *H04W 72/1284* (2013.01); *H04W 74/002* (2013.01); *H04W 74/08* (2013.01)

(58) Field of Classification Search
CPC .... H04L 12/6418; H04L 47/30; H04W 4/005; H04W 4/023; H04W 72/1205; H04W 72/14; H04W 74/002; H04W 74/08
USPC .......................................................... 370/329
See application file for complete search history.

(56) References Cited

U.S. PATENT DOCUMENTS

| | | | |
|---|---|---|---|
| 9,264,968 B2 * | 2/2016 | Tabet .................... | H04W 36/30 |
| 2009/0143074 A1 * | 6/2009 | Pelletier ............ | H04W 72/1284 455/452.2 |
| 2011/0242970 A1 * | 10/2011 | Prakash .............. | H04W 76/068 370/225 |
| 2012/0039295 A1 * | 2/2012 | Quan .................. | H04W 74/085 370/329 |

(Continued)

FOREIGN PATENT DOCUMENTS

| | | |
|---|---|---|
| EP | 2688226 A2 | 1/2014 |
| WO | 2013191353 A1 | 12/2013 |

*Primary Examiner* — Asad Nawaz
*Assistant Examiner* — Berhanu Belete
(74) *Attorney, Agent, or Firm* — Slater Matsil, LLP (57) ABSTRACT

A method for device-to-device (D2D) communications by a user device includes transmitting a first message including a proximity services (ProSe) buffer status report (BSR) to a communications controller, receiving a second message including information regarding a D2D resource grant scheduled for the user device by the communications controller, and canceling all pending ProSe BSRs in accordance with the D2D resource grant.

24 Claims, 9 Drawing Sheets

(56) References Cited

U.S. PATENT DOCUMENTS

| | | | |
|---|---|---|---|
| 2012/0076104 A1* | 3/2012 | Chun | H04W 74/0833 370/329 |
| 2012/0294269 A1* | 11/2012 | Yamada | H04L 1/1864 370/329 |
| 2012/0294270 A1* | 11/2012 | Yamada | H04W 74/02 370/329 |
| 2012/0307767 A1* | 12/2012 | Yamada | H04W 74/02 370/329 |
| 2013/0039274 A1* | 2/2013 | Lee | H04W 74/0833 370/328 |
| 2013/0150061 A1* | 6/2013 | Shin | H04W 4/005 455/450 |
| 2013/0258996 A1 | 10/2013 | Jung et al. | |
| 2013/0322413 A1* | 12/2013 | Pelletier | H04W 72/1289 370/336 |
| 2014/0010179 A1* | 1/2014 | Lee | H04W 72/0406 370/329 |
| 2014/0023008 A1 | 1/2014 | Khn et al. | |
| 2014/0064110 A1* | 3/2014 | Viorel | H04W 8/005 370/252 |
| 2014/0153390 A1* | 6/2014 | Ishii | H04W 76/023 370/230 |
| 2014/0233516 A1* | 8/2014 | Chun | H04W 24/08 370/329 |
| 2014/0328329 A1* | 11/2014 | Novlan | H04W 72/042 370/336 |
| 2014/0334389 A1* | 11/2014 | Abdel-Samad | H04W 76/06 370/329 |
| 2015/0019339 A1* | 1/2015 | Van Phan | G06Q 30/02 705/14.58 |
| 2015/0163689 A1 | 6/2015 | Lee et al. | |
| 2015/0264677 A1* | 9/2015 | He | H04W 72/02 370/312 |
| 2015/0282234 A1* | 10/2015 | Sartori | H04W 76/023 370/329 |
| 2015/0289253 A1* | 10/2015 | Pan | H04W 72/0406 370/329 |
| 2015/0296407 A1* | 10/2015 | Guo | H04W 76/043 370/230 |
| 2015/0312821 A1* | 10/2015 | Yamazaki | H04W 76/023 370/338 |
| 2015/0327312 A1* | 11/2015 | Burbidge | H04W 76/023 370/329 |
| 2015/0334756 A1* | 11/2015 | Lu | H04W 76/023 370/329 |
| 2016/0044707 A1* | 2/2016 | Folke | H04W 28/0278 370/329 |
| 2016/0219566 A1* | 7/2016 | Jung | H04W 72/04 |
| 2016/0219640 A1* | 7/2016 | Jung | H04W 72/02 |
| 2016/0269953 A1* | 9/2016 | Jung | H04W 36/06 |
| 2016/0295430 A1* | 10/2016 | Jung | H04W 24/04 |
| 2016/0337889 A1* | 11/2016 | Jung | H04W 24/04 |
| 2016/0353307 A1* | 12/2016 | Jung | H04W 24/10 |
| 2016/0353397 A1* | 12/2016 | Jung | H04W 8/005 |
| 2016/0374110 A1* | 12/2016 | Lee | H04W 4/023 |
| 2016/0381595 A1* | 12/2016 | Lee | H04W 28/0278 370/329 |
| 2017/0019812 A1* | 1/2017 | Lee | H04W 24/02 |

* cited by examiner

| MSG3: | RESOURCE GRANT: | CONTENTION RESOLUTION: |
|---|---|---|
| CELLULAR BSR | UPLINK RESOURCE | CANCELS ALL PENDING CELLULAR BSRS |
| PROSE BSR | D2D RESOURCE<br><br>UPLINK RESOURCE | CANCELS ALL PENDING PROSE BSRS<br><br>INDEFINITIVE |
| CELLULAR BSR & PROSE BSR | D2D RESOURCE<br><br>UPLINK RESOURCE | CANCELS ALL PENDING PROSE BSRS & CELLULAR BSRS<br><br>CANCELS ALL PENDING PROSE BSRS & CELLULAR BSRS |
| PERIODIC CELLULAR BSR & PROSE BSR | D2D RESOURCE<br><br>UPLINK RESOURCE | CANCELS ALL PENDING PROSE BSRS<br><br>INDEFINITIVE |
| PADDING CELLULAR BSR & PROSE BSR | D2D RESOURCE<br><br>UPLINK RESOURCE | CANCELS ALL PENDING PROSE BSRS<br><br>INDEFINITIVE |

SYSTEM AND METHOD FOR TRIGGERING AND SENDING DEVICE-TO-DEVICE BUFFER STATUS REPORT AND SCHEDULING REQUEST

This application claims the benefit of U.S. Provisional Application No. 61/991,305, filed on May 9, 2014, entitled "System and Method for Triggering and Sending D2D BSR and SR," which application is hereby incorporated herein by reference.

TECHNICAL FIELD

The present disclosure relates generally to digital communications, and more particularly to a system and method for triggering and sending device-to-device (D2D) buffer status report (BSR) and scheduling request (SR).

BACKGROUND

In Third Generation Partnership Project (3GPP) Long Term Evolution (LTE) compliant communications systems, a device indicates its resource requirements to the network (e.g., a serving base station or an evolved NodeB (eNB)) using a BSR. The BSR is sent to the network on an uplink channel along with uplink user plane data.

SUMMARY OF THE DISCLOSURE

Example embodiments of the present disclosure provide a system and method for triggering and sending device-to-device (D2D) buffer status report (BSR) and scheduling request (SR).

In accordance with an example embodiment of the present disclosure, a method for device-to-device (D2D) communications by a first user device is provided. The method includes transmitting a first message including a proximity services (ProSe) buffer status report (BSR) to a communications controller, receiving a second message including information regarding a D2D resource grant scheduled for the first user device by the communications controller, and canceling all pending ProSe BSRs in accordance with the D2D resource grant.

In accordance with another example embodiment of the present disclosure, a method for device-to-device (D2D) communications by a communications controller is provided. The method includes receiving a first message including a proximity services (ProSe) buffer status report (BSR) from a first user device, scheduling a D2D resource for the first user device to transmit to a second user device, and transmitting a second message including information regarding the D2D resource to the first user device, wherein the second message is configured to prompt the first user device to cancel the ProSe BSR.

In accordance with another example embodiment of the present disclosure, a user device configured for device-to-device (D2D) communications is provided. The user device includes a processor, and a computer readable storage medium storing programming for execution by the processor. The programming including instructions to transmit a first message including a proximity services (ProSe) buffer status report (BSR) to a communications controller, receive a second message including information regarding a D2D resource grant scheduled for the user device by the communications controller, and cancel all pending ProSe BSRs in accordance with the D2D resource grant.

In accordance with another example embodiment of the present disclosure, a communications controller configured for device-to-device (D2D) communications is provided. The communications controller includes a processor, and a computer readable storage medium storing programming for execution by the processor. The programming including instructions to receive a first message including a proximity services (ProSe) buffer status report (BSR) from a first user device, schedule a D2D resource for the first user device to transmit to a second user device, and transmit a second message including information regarding the D2D resource to the first user device, wherein the second message is configured to prompt the first user device to cancel the ProSe BSR.

Practice of the foregoing embodiments eliminates ambiguities in contention resolution involving proximity services (ProSe) BSRs, thereby ensuring that ProSe BSRs are handled effectively and efficiently.

Moreover, only a small change is needed to the technical standards, thereby simplifying adoption and implementation.

BRIEF DESCRIPTION OF THE DRAWINGS

For a more complete understanding of the present disclosure, and the advantages thereof, reference is now made to the following descriptions taken in conjunction with the accompanying drawing, in which.

DETAILED DESCRIPTION OF ILLUSTRATIVE EMBODIMENTS

The operating of the current example embodiments and the structure thereof are discussed in detail below. It should be appreciated, however, that the present disclosure provides many applicable inventive concepts that can be embodied in a wide variety of specific contexts. The specific embodiments discussed are merely illustrative of specific structures of the disclosure and ways to operate the disclosure, and do not limit the scope of the disclosure.

One embodiment of the disclosure relates to triggering and sending D2D BSR and SR. For example, a user device transmits a first message including a proximity services (ProSe) buffer status report (BSR) to a communications controller, receives a second message including information regarding a D2D resource grant scheduled for the user device by the communications controller, and cancels all pending ProSe BSRs in accordance with the D2D resource grant.

The present disclosure will be described with respect to example embodiments in a specific context, namely communications systems that use or support D2D operation. The disclosure may be applied to standards compliant communications systems, such as those that are compliant with Third Generation Partnership Project (3GPP), IEEE 802.11, and the like, technical standards, and non-standards compliant communications systems, that use or support D2D operation.

Figure 1:
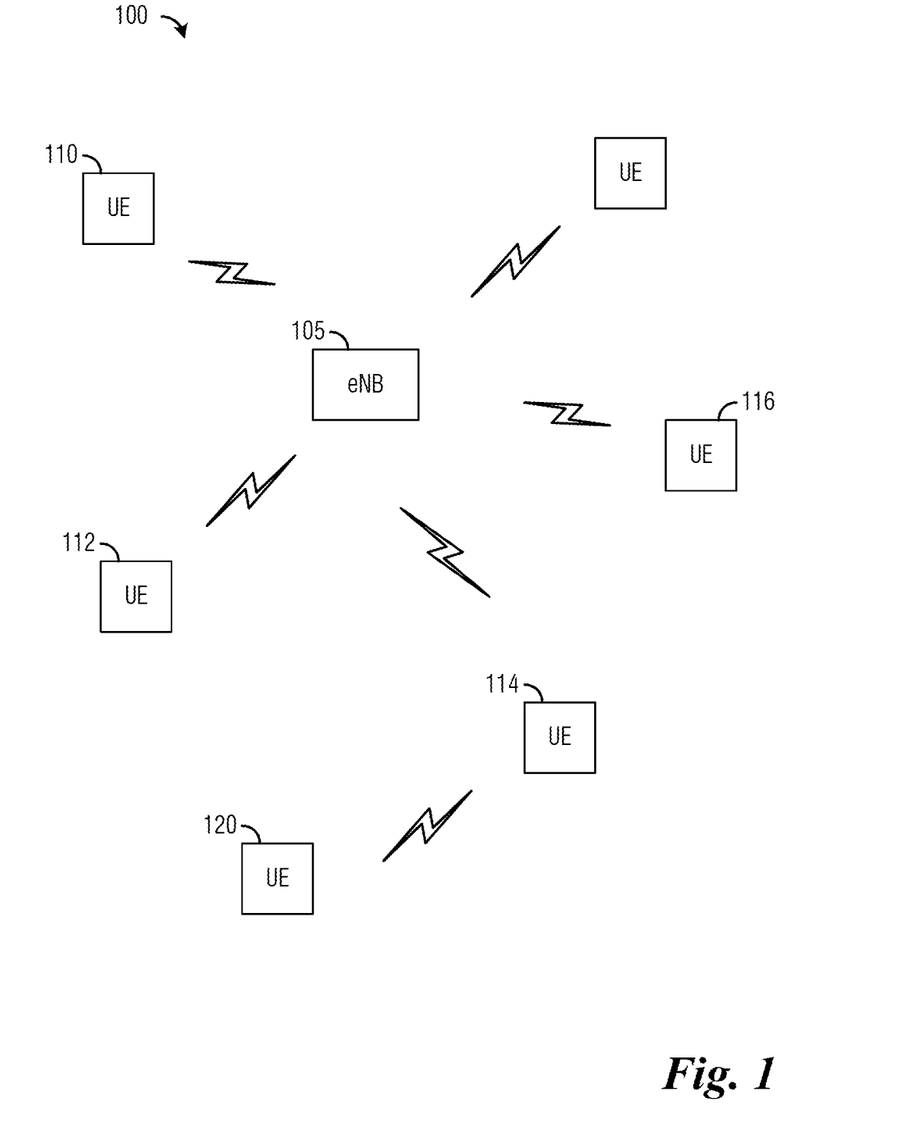
FIG. 1 illustrates an example communications system according to example embodiments described herein.

FIG. 1 illustrates an example communications system 100. Communications system 100 includes an evolved NodeB (eNB) 105 serving a plurality of user equipment (UEs), such as UE 110, UE 112, UE 114, and UE 116. eNB 105 is serving the plurality of UEs by receiving transmission intended for a UE and then forwarding the transmission to the UE or receiving a transmission from a UE and then forwarding the transmission to its intended destination. In such a communications mode, eNB 105 and the plurality of UEs are said to be operating in a cellular mode. eNBs may also be commonly referred to as NodeBs, access points, base stations, controllers, communications controllers, and the like, while UEs may also be commonly referred to as mobiles, mobile stations, terminals, users, subscribers, stations, and the like.

D2D communications is a different operating mode where UEs can directly transmit to one another without having their transmissions being relayed by an eNB. As shown in FIG. 1, UE 114 is communicating directly with UE 120. UE 114 may be capable of communicating in the cellular mode as well as in the D2D mode. UE 120 is operating in a D2D mode, but it may also be possible that UE 120 is capable of operating in the cellular mode with eNB 105 or even with a different eNB (e.g., in another cell). However, such operations involving UE 120 are not shown in FIG. 1.

While it is understood that communications systems may employ multiple eNBs capable of communicating with a number of UEs, only one eNB, and a number of UEs are illustrated for simplicity.

In a 3GPP LTE compliant communications system, when a UE has a requirement for resources, for example, to transmit information or data, the UE may indicate its resource requirement to its serving eNB. The UE may send a BSR or a SR to its serving eNB, wherein the SR is an explicit request for an uplink resource to be scheduled for this UE, without indicating the amount of information or data that needs to be transmitted, while the BSR provides an indication of the amount of information or data the UE has to transmit, and the serving eNB may or may not provide an uplink resource grant to the UE. An SR is transmitted by the UE on a specific physical uplink control channel (PUCCH) resource allocated by the eNB to the UE. If the UE has an existing uplink resource grant, the UE may include the BSR along with information or data in a transmission(s) in the existing uplink resource grant. If the UE does not have either a PUCCH resource allocated for SR nor an existing uplink resource grant, the UE may participate in the random access procedure involving a random access channel (RACH) in order to obtain an uplink resource grant to transmit the BSR or uplink data.

Figure 2A:
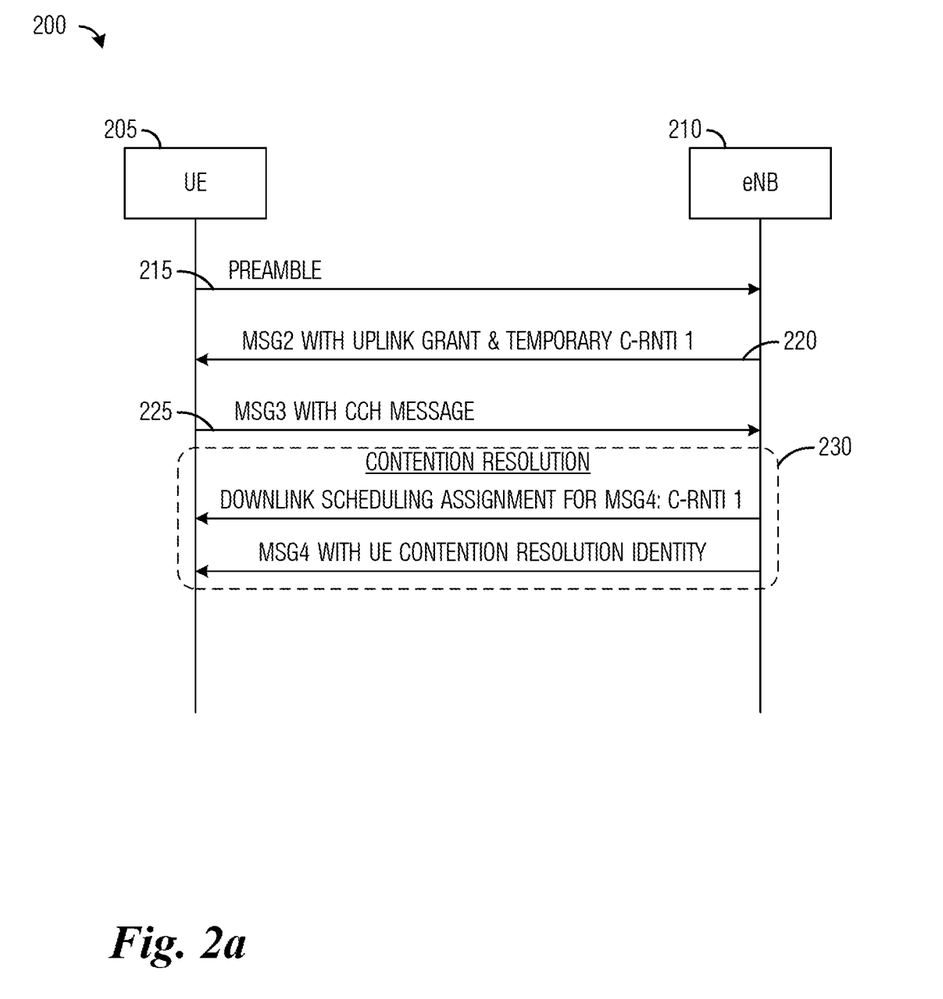
FIG. 2a illustrates a message exchange diagram highlighting an example random access procedure used by a UE to request the establishment or re-establishment of a connection with the eNB according to example embodiments described herein.

FIG. 2a illustrates a message exchange diagram 200 highlighting an example random access procedure used by a UE to request the establishment or re-establishment of a connection with the eNB. Message exchange diagram 200 shows messages exchanged between a UE 205 and its serving eNB 210. When UE 205 needs to communicate with the network, it first needs to establish a connection with the eNB. Alternatively UE 205 may need to re-establish a connection with the eNB, as may occur following loss of connectivity due to a radio link failure. UE 205 may participate in a random access procedure to obtain an uplink resource, which would enable UE 205 to transmit control messages to eNB 210. UE 205 may initiate the random access procedure by selecting a preamble out of a plurality of preambles allocated for use in random access procedures and send the selected preamble to eNB 210 (shown as event 215). UE 205 may also include information identifying itself, such as UE identifying information, media access control (MAC) identifying information, and the like, along with the preamble.

eNB 210 may, after receiving the preamble from UE 205, allocate one or more uplink resources for UE 205. eNB 210 may send a message (MSG2) to UE 205, with the message including information about the uplink resource grant that eNB 210 has allocated in response to receiving the preamble (shown as event 220). The MSG2 may also include the preamble or an indicator of the preamble associated with the uplink resource grant specified in the message. MSG2 may also include a Cell Radio Network Temporary Identifier (C-RNTI 1) for UE 205. The C-RNTI is an identifier that is used to identify subsequent uplink resource grants or downlink scheduling assignments made by eNB 210 to UE 205, which may be communicated to UE 205 using the Physical Downlink Control Channel (PDCCH).

UE 205 may use the uplink resource grant as specified in the MSG2 to send another message (MSG3) to eNB 210 (shown as event 225). As an illustrative example, UE 205 may use the uplink resource to transmit the information or data that it has buffered towards eNB 210. MSG3 may include a control CCH message such as a Common Control Channel (CCCH) message (as shown as event 225). Examples of CCCH messages are a Radio Resource Control (RRC) Connection Request or RRC Connection Re-establishment Request. The CCCH messages may indicate to eNB 210 that UE 205 desires to establish or re-establish an RRC connection to communicate additional information or data with the eNB.

To complete the random access procedure, eNB 210 and UE 205 may perform contention resolution (block 230). As an illustrative example of contention resolution, consider a situation wherein there are two UEs where each initiates a random access procedure towards the eNB in order to communicate information or buffered data, and both UEs select the same preamble out of the plurality of preambles to initiate the random access procedure. The MSG2 sent by eNB 210 containing information about the uplink resource grant may include the preamble associated with the uplink resource grant, but it does not indicate to which of the two UEs the uplink resource grant is assigned. Therefore, there is a potential for confusion. Contention resolution indicates that eNB 210 has unambiguously identified UE 205, and associated UE 205 with a new or pre-existing RRC connection. It is not until eNB 210 specifically addresses a message or allocates a resource to one of the two UEs that the confusion is resolved.

eNB 210 may send yet another message (MSG4) which may be used for contention resolution purposes, in the case where MSG3 included a CCCH message. eNB 210 will use C-RNTI 1 to identify the downlink scheduling assignment for the resource where it transmits MSG4 towards the UE 205. In this case MSG4 includes a UE Contention Resolution Identity matching the CCCH message contained in MSG3. Reception of this information in MSG4 by UE 205 completes the contention resolution by indicating to UE 205 that eNB 210 has established a new RRC connection, or reestablished a previous RRC connection. eNB 210 will use C-RNTI 1 to identify uplink resource grants or downlink scheduling assignments for the RRC connection of UE 205 going forward.

Figure 2B:
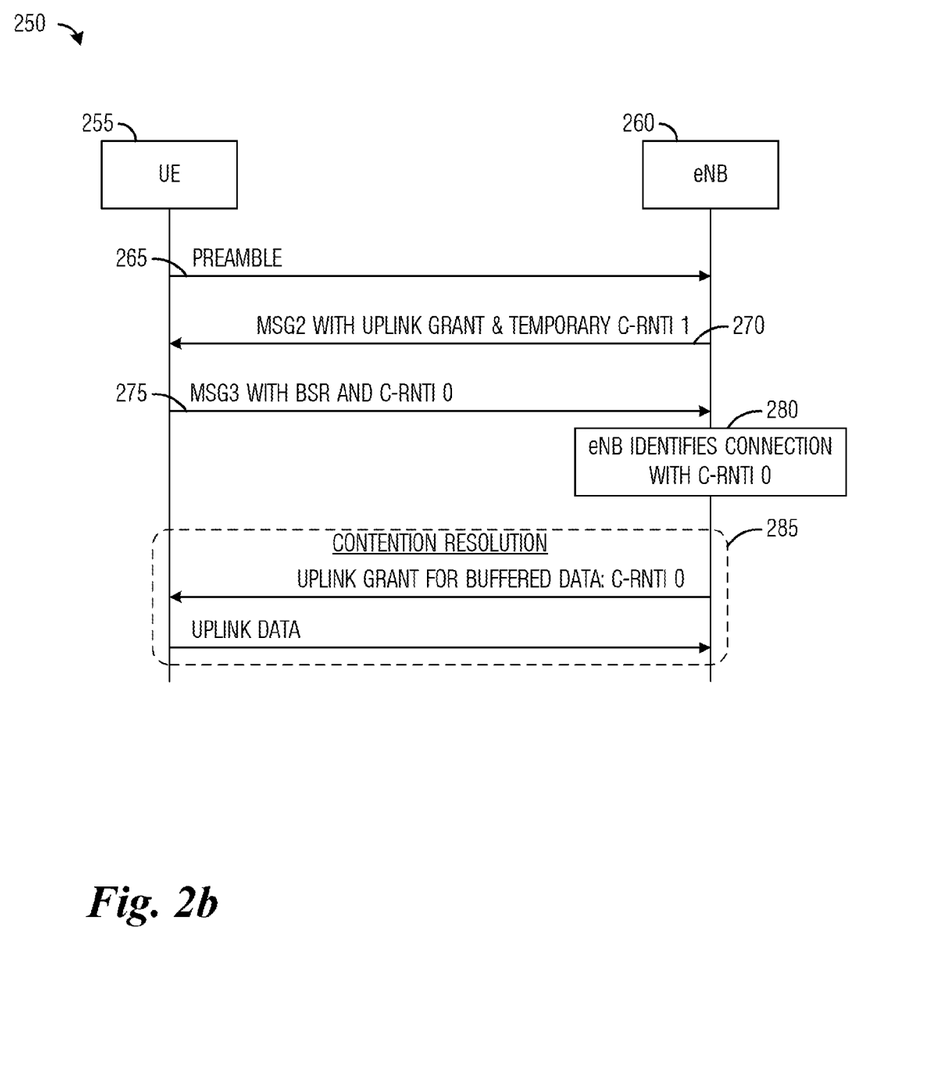
FIG. 2b illustrates a message exchange diagram highlighting an example random access procedure used by a UE to send a BSR to its serving eNB according to example embodiments described herein.

FIG. 2*b* illustrates a message exchange diagram 250 highlighting an example random access procedure used by a UE to send a BSR to its serving eNB. Without loss of generality, BSRs and/or SRs are used herein to refer to BSRs and/or SRs to request uplink resources. In other words, they are BSRs and/or SRs intended to obtain cellular resources and may be referred to as cellular BSRs and/or cellular SRs. In situations when discussing other types of BSRs and/or SRs, they will be clearly differentiated.

Message exchange diagram 250 shows messages exchanged between a UE 255 and its serving eNB 260. When UE 255 has information or data buffered and ready to transmit but does not already have an existing uplink resource grant, nor does it have a PUCCH resource to transmit an SR towards the eNB, UE 255 may participate in a random access procedure to obtain an uplink resource, which would enable UE 255 to transmit a BSR. Such a message exchange may be used in case UE 255 had previously been allocated a C-RNTI 0 to identify an RRC connection to the eNB, but may for example have suspended the use of this RRC connection due to there being no buffered data to send for a prescribed period of time. UE 255 may initiate the random access procedure by selecting a preamble out of a plurality of preambles allocated for use in random access procedures and send the selected preamble to eNB 260 (shown as event 265). UE 255 may also include information identifying itself, such as UE identifying information, media access control (MAC) identifying information, and the like, along with the preamble.

eNB 260 may, after receiving the preamble from UE 255, allocate one or more uplink resources for UE 255. eNB 260 may send a message (MSG2) to UE 255, with the message including information about the uplink resource grant that eNB 260 has allocated in response to receiving the preamble (shown as event 270). The MSG2 may also include the preamble or an indicator of the preamble associated with the uplink resource grant specified in the message. MSG2 may also include a Cell Radio Network Temporary Identifier (C-RNTI 1) for UE 255.

UE 255 may use the uplink resource grant as specified in the MSG2 to send another message (MSG3) to eNB 260 (shown as event 275). As an illustrative example, UE 255 may use the uplink resource to transmit the information or data that it has buffered towards eNB 260.

If UE 255 had previously established an RRC connection with eNB 260 it would already have a C-RNTI (C-RNTI 0) from eNB 260 identifying this RRC connection. If MSG2 does not include a CCCH message, then MSG3 should include C-RNTI 0. The eNB 260 may use C-RNTI 0 to unambiguously identify UE 255, and associate UE 255 with a previously established RRC connection (block 280).

To complete the random access procedure, eNB 260 and UE 255 may perform contention resolution (block 285). As an illustrative example of contention resolution, consider a situation wherein there are two UEs with buffered data and both UEs select the same preamble out of the plurality of preambles to initiate the random access procedure. The MSG2 sent by eNB 260 containing information about the uplink resource grant may include the preamble associated with the uplink resource grant, but it does not indicate to which of the two UEs the uplink resource grant is assigned. Therefore, there is a potential for confusion. Contention resolution indicates that eNB 260 has unambiguously identified UE 255, and associated UE 255 with an RRC connection. It is not until eNB 260 specifically addresses a message or allocates a resource to one of the two UEs that the confusion is resolved.

In the case where MSG3 did not include a CCCH message, contention resolution is indicated by an uplink resource grant or a downlink scheduling assignment to UE 255. This resource grant is signaled by eNB 260 on the PDCCH, and is identified to UE 255 by C-RNTI 0. Reception by UE 255 of an uplink resource grant or a downlink resource allocation identified by C-RNTI 0 is an indication that eNB 260 is communicating with UE 255 using the previously established RRC connection identified by C-RNTI 0, completing the contention resolution. As an illustrative example, UE 255 may use the uplink resource to transmit the information or data that it has buffered towards eNB 260. eNB 260 will use C-RNTI 0 to identify uplink resource grants or downlink scheduling assignments for the RRC connection of UE 255 going forward, and UE 255 may therefore discard C-RNTI 1.

With D2D communications, also commonly referred to as proximity services (ProSe) communications, user plane data is transmitted directly from one UE to another UE, while the serving eNB remains responsible for allocating the resources for the transmissions. Therefore, if a UE wants to transmit information or data using D2D communications, it may first request a D2D resource (or also commonly referred to as a sidelink resource) from the eNB using a separate uplink channel.

Once an RRC connection with the eNB has been established, both the UE and eNB may use the RRC connection to communicate information or data to each other. As an illustrative example, a UE may use the RRC connection to communicate addition control channel messages to an eNB, such as to indicate the need of the UE to engage in device to device communication with other UEs. The eNB may use the RRC connection to communicate additional control messages to the UE, such as to configure or reconfigure the RRC connection. As an illustrative example, the eNB may configure the UE to engage in device to device communication with other UEs. As an illustrative example this may include configuring an additional C-RNTI used to identify sidelink grants to be used by the UE to transmit data directly to other UEs on a sidelink resource. Such a C-RNTI used for sidelink communication may be designated as a sidelink RNTI (SL-RNTI).

According to an example embodiment, a UE reuses mechanisms such as BSR and/or SR for the purpose of requesting a D2D resource. Example embodiments provide mechanisms to trigger the transmission of these control signals to the serving eNB. Example embodiments provide mechanisms to trigger BSRs and/or SRs for D2D communications in a 3GPP LTE compliant communications system.

Figure 3:
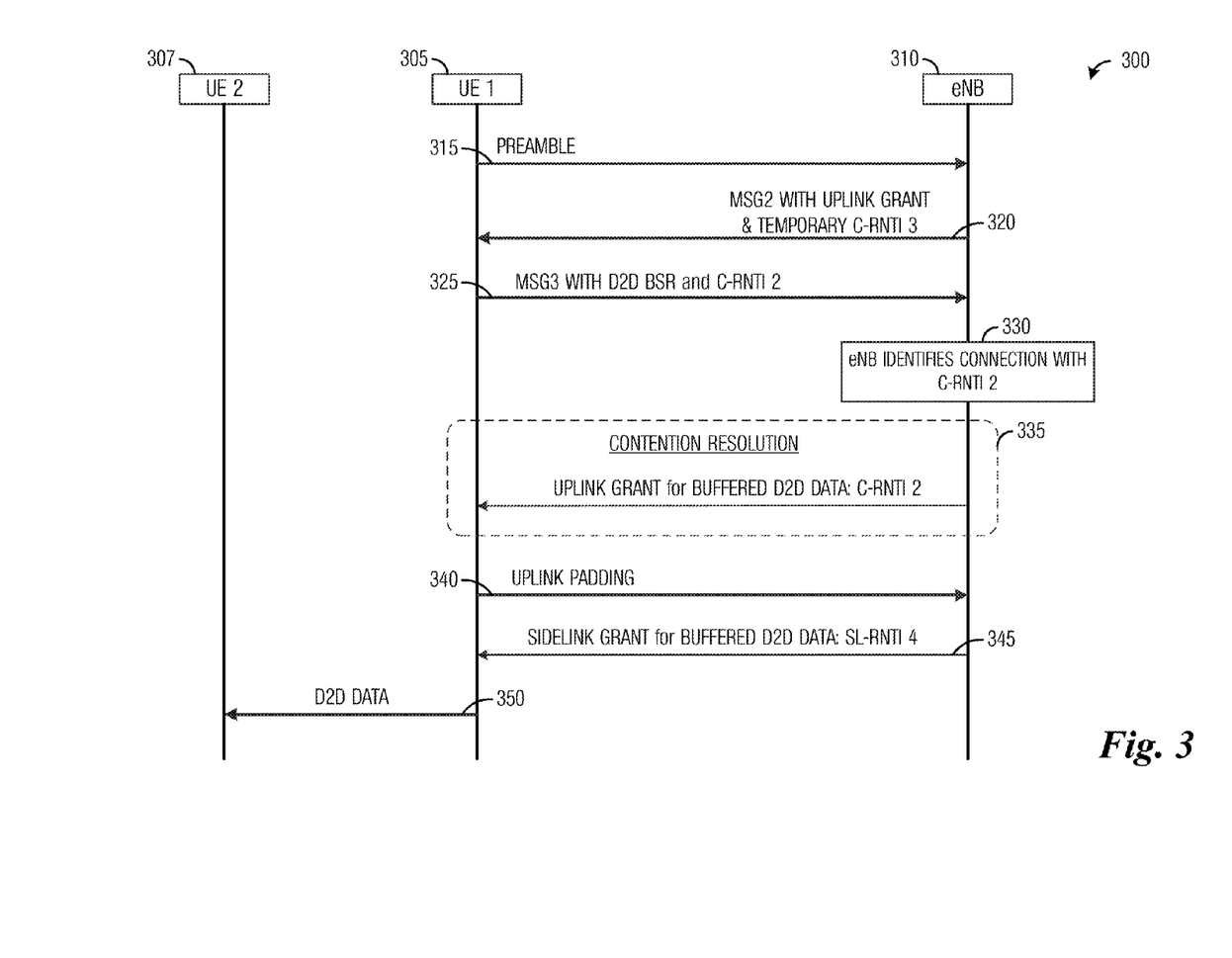
FIG. 3 illustrates a message exchange diagram highlighting an example random access procedure used by a UE to send ProSe BSR for the purpose of requesting a D2D resource according to example embodiments described herein.

FIG. 3 illustrates a message exchange diagram 300 highlighting an example random access procedure used by a UE to send ProSe BSR for the purpose of requesting a D2D resource. Message exchange diagram 300 shows messages exchanged between a UE 305 and its serving eNB 310. When UE 305 has information or data buffered and ready to transmit to another device such as UE 307, but does not already have an existing D2D resource grant, nor does it have an existing uplink resource grant to transmit a ProSe BSR or a PUCCH resource to transmit an SR towards the eNB, UE 305 may participate in a random access procedure to obtain a D2D resource, which would enable UE 305 to transmit information and/or data directly to another device. UE 305 may initiate the random access procedure by selecting a preamble out of a plurality of preambles allocated for use in random access procedures and send the selected preamble to eNB 310 (shown as event 315). UE 305 may also include information identifying itself, such as UE identifying information, MAC identifying information, and the like, along with the preamble.

eNB 310 may, after receiving the preamble from UE 305, allocate one or more uplink resources for UE 305. eNB 310 may send a message (MSG2) to UE 305, with the message including information about the uplink resource grant that eNB 310 has allocated in response to receiving the preamble (shown as event 320). The MSG2 may also include the preamble or an indicator of the preamble associated with the uplink resource grant specified in the message. MSG2 may also include a Cell Radio Network Temporary Identifier (C-RNTI 3) for UE 305.

UE 305 may use the uplink resource grant as specified in the MSG2 to send another message (MSG3) including a ProSe BSR to eNB 310 (shown as event 325). If UE 305 had previously established an RRC connection with eNB 310 it would already have a C-RNTI (C-RNTI 2) from eNB 310 identifying this RRC connection. If MSG2 does not include a CCCH message, then MSG3 should include C-RNTI 2. The eNB 310 may use C-RNTI 2 to unambiguously identify UE 305, and associate UE 305 with a previously established RRC connection (block 330).

To complete the random access procedure, eNB 310 and UE 305 may perform contention resolution (block 335). As with the previously discussed random access procedure (as shown in message exchange diagram 250 of FIG. 2b), if MSG3 did not include a CCCH message, contention resolution can be achieved by eNB 310 signaling an uplink resource grant or a downlink scheduling assignment to UE 305, identified by C-RNTI 2, in a PDCCH.

In current 3GPP LTE technical standards, contention resolution is defined based on the presence or absence of an uplink resource grant identified with C-RNTI 2. As an illustrative example, in message exchange 300 eNB 310 provides an uplink grant to UE 305 to achieve contention resolution in block 335. However, since no uplink resource was requested in MSG3 (no cellular BSR), generally no uplink resource grant need be provided to UE 305. Therefore, UE 305 transmits padding on the granted uplink resource towards eNB 310 (shown as event 340).

In order to address the D2D resource request indicated in the D2D BSR of MSG3, eNB 310 may provide an additional sidelink resource grant to UE 305 (shown as event 345). The sidelink resource grant may be distinguished by a previously allocated SL-RNTI 4. Finally, UE 305 may use the sidelink resource provided by eNB 310 to transmit D2D data to UE 307 (shown as event 350). Thus an uplink resource is wasted on padding, but is only allocated to UE 305 to achieve contention resolution in accordance with the current 3GPP LTE technical standard. While a second sidelink resource grant must be provided in order for UE 305 to transmit the D2D data towards UE 307.

As an illustrative example, consider a situation wherein a UE sends a BSR to its serving eNB in MSG3 and the serving eNB responds with an uplink resource grant on the PDCCH, the uplink resource grant will allow contention resolution to operate properly. However, in another situation wherein the UE sends a ProSe BSR to its serving eNB in MSG3 and the serving eNB responds with a D2D resource grant on the PDCCH, the presence of the D2D resource grant and the absence of an uplink resource grant on the PDCCH may not allow contention resolution to operate properly although the serving eNB has satisfied the ProSe BSR.

Figure 4:
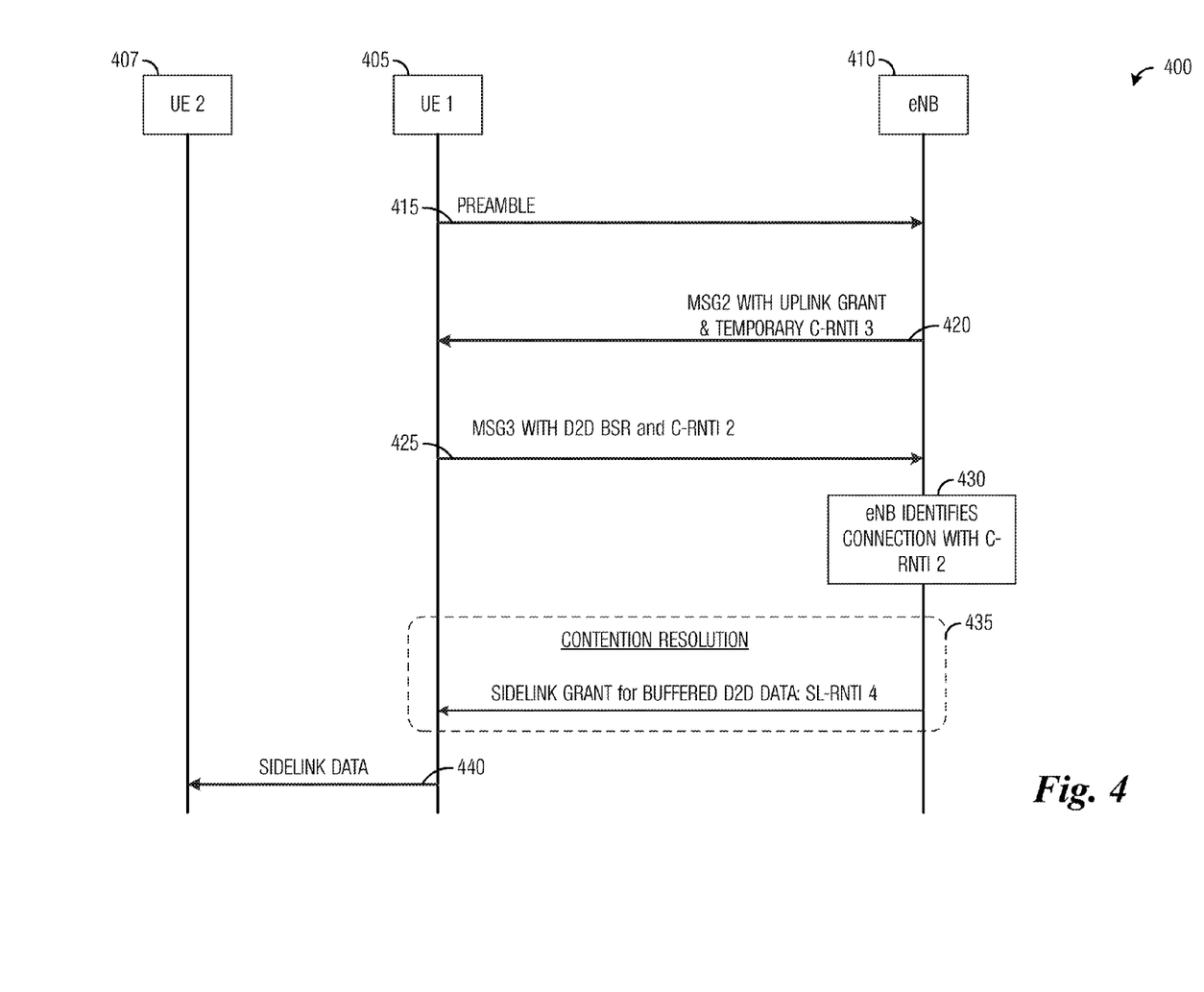
FIG. 4 illustrates a message exchange diagram highlighting an example random access procedure used by a UE to send ProSe BSR for the purpose of requesting a D2D resource according to example embodiments described herein.

FIG. 4 illustrates a message exchange diagram 400 highlighting an example embodiment of random access procedure used by a UE to send ProSe BSR for the purpose of requesting a D2D resource. Message exchange diagram 400 shows messages exchanged between a UE 405 and its serving eNB 410. When UE 405 has information or data buffered and ready to transmit to another device such as UE 407, but does not already have an existing D2D resource grant, nor does it have an existing uplink resource grant to transmit a ProSe BSR or a PUCCH resource to transmit an SR towards the eNB, UE 405 may participate in a random access procedure to obtain a D2D resource, which would enable UE 405 to transmit information and/or data directly to another device. UE 405 may initiate the random access procedure by selecting a preamble out of a plurality of preambles allocated for use in random access procedures and send the selected preamble to eNB 410 (shown as event 415). UE 405 may also include information identifying itself, such as UE identifying information, MAC identifying information, and the like, along with the preamble.

eNB 410 may, after receiving the preamble from UE 405, allocate one or more uplink resources for UE 405. eNB 410 may send a message (MSG2) to UE 405, with the message including information about the uplink resource grant that eNB 410 has allocated in response to receiving the preamble (shown as event 420). The MSG2 may also include the preamble or an indicator of the preamble associated with the uplink resource grant specified in the message. MSG2 may also include a Cell Radio Network Temporary Identifier (C-RNTI 3) for UE 305.

UE 405 may use the uplink resource grant as specified in the MSG2 to send another message (MSG3) including a ProSe BSR to eNB 410 (shown as event 425). If UE 405 had previously established an RRC connection with eNB 410 it would already have a C-RNTI (C-RNTI 2) from eNB 410 identifying this RRC connection. If MSG2 does not include a CCCH message, then MSG3 should include C-RNTI 2. The eNB 410 may use C-RNTI 2 to unambiguously identify UE 405, and associate UE 405 with a previously established RRC connection (block 430).

To complete the random access procedure, eNB 410 and UE 405 may perform contention resolution (block 435). In contrast to the previously discussed random access procedure (as shown in message exchange diagram 300 of FIG. 3), if MSG3 did not include a CCCH message, contention resolution can be achieved by eNB 410 signaling a sidelink resource grant to UE 405 in a PDCCH (shown as event 445). The sidelink resource grant may be distinguished by a previously allocated SL-RNTI 4.

Finally, UE 405 may use the sidelink resource provided by eNB 410 to transmit D2D data to UE 407 as indicated by event 440. In contrast to message exchange 300 of FIG. 3, no uplink resource is wasted on padding, and only a single sidelink resource grant is provided by eNB 410. The sidelink grant both completes the contention resolution (block 435) and grants a sidelink resource to UE 305 to transmit the D2D data towards UE 307 (shown as event 440).

According to an example embodiment, the contention resolution process is considered successful when a random access procedure is initiated by a UE with MSG3 of the procedure including a ProSe BSR and the eNB provides a D2D resource grant to the UE. The random access procedure is also considered to have completed successfully. Receiving the D2D resource grant from the eNB also indicates to the UE that MSG3 (including the ProSe BSR) was successfully received by the eNB, and the UE may cancel any pending ProSe BSRs.

According to an example embodiment, the contention resolution process is considered successful when a random access procedure is initiated by a UE with MSG3 of the procedure including both a cellular BSR and a ProSe BSR and when the eNB provides either an uplink resource grant or a D2D resource grant to the UE. The random access procedure is also considered to have completed successfully. Receiving either of the uplink resource grant or the D2D resource grant from the eNB also indicates to the UE that MSG3 (including both the cellular BSR the ProSe BSR) was successfully received by the eNB, and the UE may cancel any pending cellular BSRs or ProSe BSRs.

According to an example embodiment, the contention resolution process is considered successful when a random access procedure is initiated by a UE with MSG3 of the procedure including a periodic cellular BSR and a ProSe BSR and when the eNB provides a D2D resource grant to the UE. The random access procedure is also considered to have completed successfully. Receiving the D2D resource grant from the eNB also indicates to the UE that MSG3 (including the ProSe BSR) was successfully received by the eNB, and the UE may cancel any pending ProSe BSRs. However, if the eNB provides only an uplink resource grant, the UE may not be certain that the eNB successfully received MSG3 (including the ProSe BSR). Therefore, the contention resolution process is not considered successful and the random access procedure is also considered to have not completed successfully.

According to an example embodiment, the contention resolution process is considered successful when a random access procedure is initiated by a UE with MSG3 of the procedure including a padding BSR and a ProSe BSR and when the eNB provides a D2D resource grant. The random access procedure is also considered to have completed successfully. Receiving the D2D resource grant from the eNB also indicates to the UE that MSG3 (including the ProSe BSR) was successfully received by the eNB, and the UE may cancel any pending ProSe BSRs. However, if the eNB provides only an uplink resource grant, the UE may not be certain that the eNB successfully received MSG3 (including the ProSe BSR). Therefore, the contention resolution process is not considered successful and the random access procedure is also considered to have not completed successfully.

Figure 5:
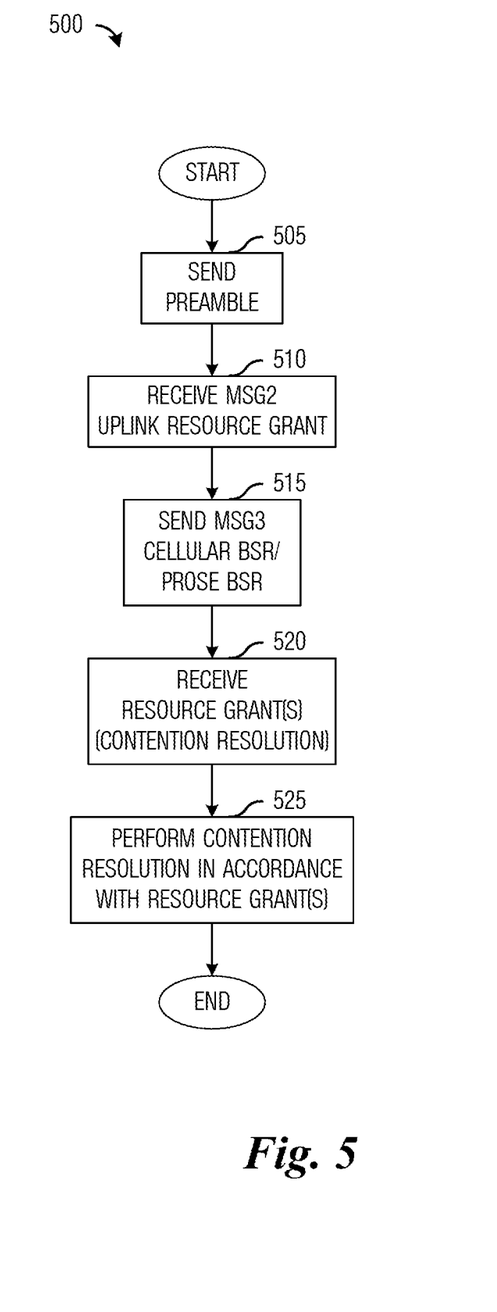
FIG. 5 illustrates a flow diagram of example operations occurring in a UE participating in a random access procedure to obtain a D2D resource

FIG. 5 illustrates a flow diagram of example operations 500 occurring in a UE participating in a random access procedure to obtain a D2D resource. Operations 500 may be indicative of operations occurring in a UE as the UE obtains a D2D resource, among other resources.

Operations 500 may begin with the UE selecting and sending a preamble to an eNB (block 505). The UE may receive a message (MSG2) from the eNB including an uplink resource grant (block 510). The UE may use the uplink resource allocated by the eNB to send a wide range of information and/or data, including ProSe BSRs, ProSe SRs, BSRs, SRs, and the like. The UE may send a message (MSG3) to the eNB in the uplink resource (block 515). For discussion purposes, consider a situation where the MSG3 includes at least a ProSe BSR. The MSG3 may also include a BSR, a periodic BSR, a padding BSR, and the like. The UE may receive one or more resource grants from the eNB (block 520). One resource grant may include a D2D resource, among other things. The same or another resource grant may also include an uplink resource (e.g., in situations where the MSG3 includes a BSR, a periodic BSR, a padding BSR, and the like). The UE may perform contention resolution in accordance with the resource grant and the contents therein (block 525).

Figure 6:
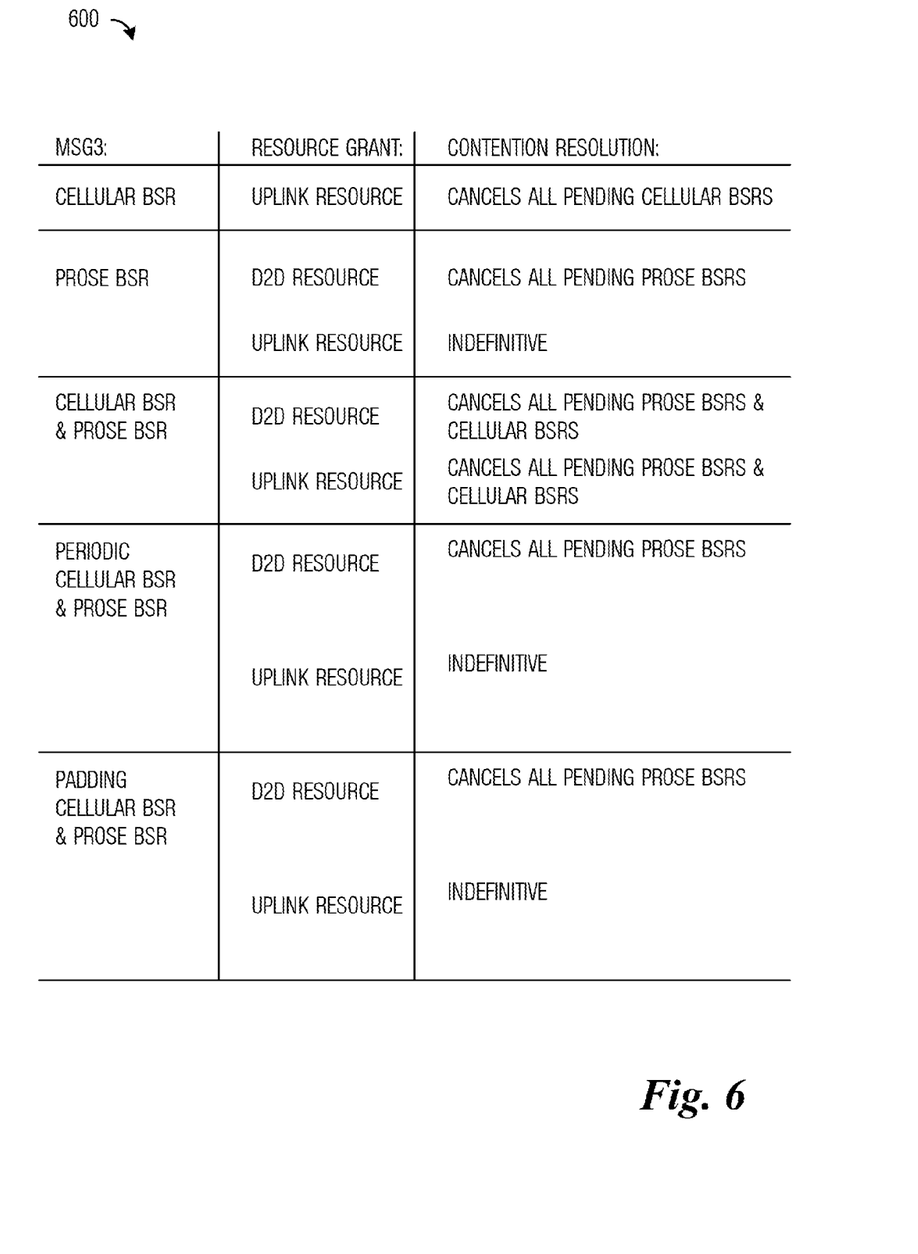
FIG. 6 illustrates a table highlighting contention resolution rules for different possibilities for BSRs in MSG3 and resource grants in MSG4

FIG. 6 illustrates a table 600 highlighting contention resolution rules for different possibilities for BSRs in MSG3 and subsequent resource grants. As an illustrative example, if the MSG3 included a cellular BSR and a subsequent resource grant included an uplink resource, then all pending cellular BSRs are cancelled (satisfied). As another illustrative example, if the MSG3 included a ProSe BSR and a subsequent resource grant included a D2D resource, then all pending ProSe BSRs are cancelled. However, if no subsequent resource grant included a D2D resource, then the contention resolution is indefinite. As yet another illustrative example, if the MSG3 included a ProSe BSR and a cellular BSR and subsequent resource grant(s) included a D2D resource or an uplink resource, then all pending cellular BSRs and ProSe BSRs are cancelled.

Figure 7:
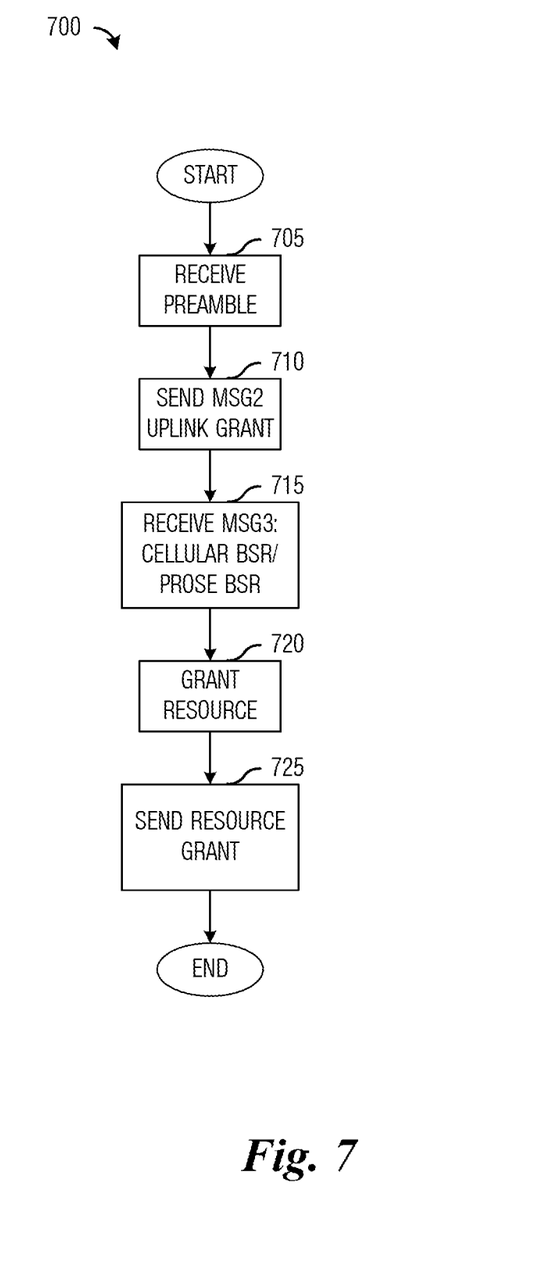
FIG. 7 illustrates a flow diagram of example operations occurring in an eNB participating in a random access procedure to provide a D2D resource grant

FIG. 7 illustrates a flow diagram of example operations 700 occurring in an eNB participating in a random access procedure to provide a D2D resource grant. Operations 700 may be indicative of operations occurring in an eNB as the eNB provides a D2D resource grant, among other resource grants.

Operations 700 may begin with the eNB receiving a preamble from a UE (block 705). The eNB may send a message (MSG2) including an uplink resource grant to the UE (block 710). The eNB may receive a message (MSG3) including a ProSe BSR, among other BSRs (block 715). The eNB may grant a D2D resource in accordance with the ProSe BSR (block 720). If the MSG3 included other BSRs, the eNB may grant other resources in accordance with the other BSRs. The eNB may send a resource grant including the D2D resource to the UE (block 725).

Figure 8:
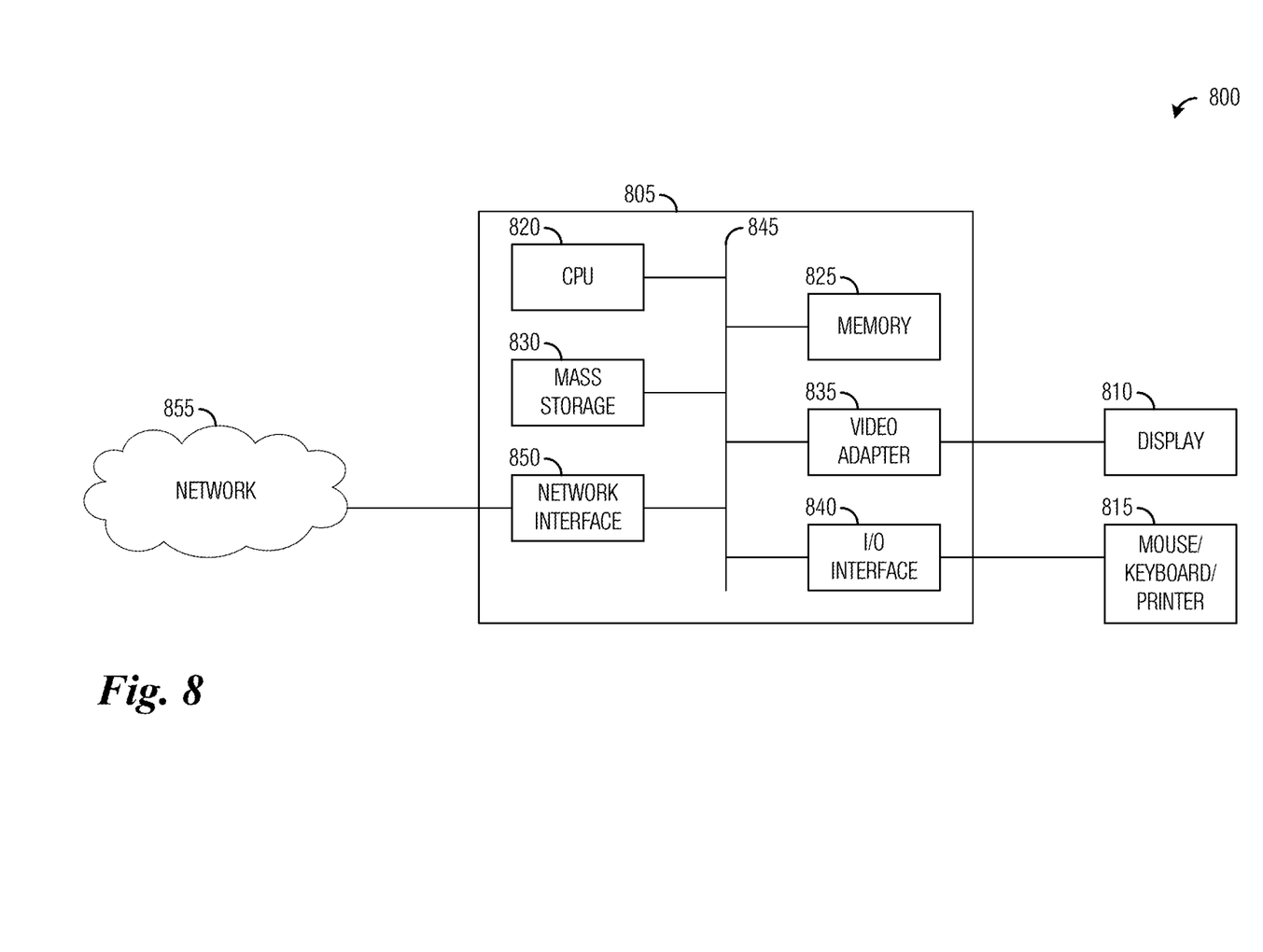
FIG. 8 is a block diagram of a processing system that may be used for implementing the devices and methods disclosed herein

FIG. 8 is a block diagram of a processing system 800 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit 805 equipped with one or more input/output devices, such as a human interface 815 (including speaker, microphone, mouse, touchscreen, keypad, keyboard, printer, and the like), display 810, and so on. The processing unit may include a central processing unit (CPU) 820, memory 825, a mass storage device 830, a video adapter 835, and an I/O interface 840 connected to a bus 845.

The bus may be one or more of any type of several bus architectures including a memory bus or memory controller, a peripheral bus, video bus, or the like. The CPU may comprise any type of electronic data processor. The memory may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

The mass storage device may comprise any type of storage device configured to store data, programs, and other information and to make the data, programs, and other information accessible via the bus. The mass storage device may comprise, for example, one or more of a solid state drive, hard disk drive, a magnetic disk drive, an optical disk drive, or the like.

The video adapter and the I/O interface provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface such as Universal Serial Bus (USB) (not shown) may be used to provide an interface for a printer.

The processing unit also includes one or more network interfaces 850, which may comprise wired links, such as an Ethernet cable or the like, and/or wireless links to access nodes or different networks 855. The network interface allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

Although the present disclosure and its advantages have been described in detail, it should be understood that various changes, substitutions and alterations can be made herein without departing from the spirit and scope of the disclosure as defined by the appended claims.

What is claimed is:

1. A method for device-to-device (D2D) communications comprising:
    transmitting, by a first user device, a first message including a proximity services (ProSe) buffer status report (BSR) to a communications controller in an uplink resource that is granted in response to a preamble sent by the first user device during a random access procedure initiated by the first user device, the ProSe BSR being one of a plurality of pending ProSe BSRs, and each of the plurality of pending ProSe BSRs indicating an amount of data stored in a buffer of the first user device that is for the first user device to directly transmit to a second user device in D2D transmission;
    receiving, by the first user device, a second message including information regarding a D2D resource grant, the D2D resource grant being scheduled by the communications controller in response to receipt of the ProSe BSR and being scheduled for the first user device to communicate directly with the second user device, wherein receipt of the D2D resource grant indicates that a contention resolution process of the random access procedure is completed; and
    canceling, by the first user device, all pending ProSe BSRs upon receiving the D2D resource grant.

2. The method of claim 1, wherein the first message comprises a cellular BSR, and wherein the method further comprising:
    canceling all pending cellular BSRs in accordance with upon receiving the D2D resource grant.

3. The method of claim 1, wherein the first message comprises a periodic cellular BSR.

4. The method of claim 1, further comprising prior to transmitting the first message:
    selecting a preamble out of a plurality of preambles reserved for random access;
    transmitting the preamble to the communications controller; and
    receiving a third message including information regarding an uplink resource grant scheduled for the first user device by the communications controller.

5. The method of claim 4, wherein the first message is transmitted in an uplink resource in accordance with the uplink resource grant.

6. The method of claim 4, wherein the third message includes an indicator of the preamble.

7. The method of claim 1, further comprising:
    transmitting one of a fourth message and data to a second user device in a D2D resource in accordance with the information regarding the D2D resource grant.

8. The method of claim 1, wherein cancelling all pending ProSe BSRs comprises considering all of the pending ProSe BSRs as being satisfied.

9. A method for device-to-device (D2D) communications comprising:
    receiving, by a communications controller during a random access procedure initiated by a first user device, a first message including a proximity services (ProSe) buffer status report (BSR) from the first user device, the first message being received in an uplink resource that is granted by the communications controller in response to a preamble sent by the first user device during the random access procedure, the ProSe BSR being one of a plurality of pending ProSe BSRs, and each of the plurality of pending ProSe BSRs indicating an amount of data stored in a buffer of the first user device that is available for the first user device to directly transmit to a second user device in D2D transmission;
    scheduling, by the communications controller in response to receipt of the ProSe BSR, a D2D resource for the first user device to transmit to a second user device; and
    transmitting, by the communications controller, a second message including information regarding the D2D resource to the first user device, wherein the second message is configured to prompt the first user device to cancel all pending ProSe BSRs and to indicate to the first user device that a contention resolution process of the random access procedure is completed.

10. The method of claim 9, wherein the first message further comprises a cellular BSR, and wherein the method further comprises:
    transmitting the second message including information regarding the D2D resource to the first user device, wherein the second message is configured to prompt the first user device to cancel all pending ProSe BSRs.

11. The method of claim 9, wherein the first message further comprises a periodic cellular BSR, and wherein the method further comprises:
    transmitting the second message including information regarding the D2D resource to the first user device, wherein the second message is configured to prompt the first user device to cancel all pending ProSe BSRs.

12. The method of claim 9, further comprising:
receiving a preamble out of a plurality of preambles reserved for random access from the first user device;
scheduling an uplink resource for the first user device to transmit the ProSe BSR to the communications controller; and
transmitting a third message including information regarding the uplink resource to the first user device.

13. The method of claim 12, wherein the first message includes an indication of the preamble.

14. A user device configured for device-to-device (D2D) communications, the user device comprising:
a processor; and
a computer readable storage medium storing programming for execution by the processor, the programming including instructions to:
transmit a first message including a proximity services (ProSe) buffer status report (BSR) to a communications controller in an uplink resource that is granted in response to a preamble sent by the user device during a random access procedure initiated by the user device, the ProSe BSR being one of a plurality of pending ProSe BSRs, and each of the plurality of pending ProSe BSRs indicating an amount of data stored in a buffer of the user device for the user device to directly transmit to a second user device in D2D transmission;
receive a second message including information regarding a D2D resource grant, the D2D resource grant being scheduled for the user device by the communications controller in response to receipt of the ProSe BSR and being scheduled for the user device to communicate directly with the second user device, wherein receipt of the D2D resource grant indicates that a contention resolution process of the random access procedure is completed; and
cancel all pending ProSe BSRs in accordance with upon receiving the D2D resource grant.

15. The user device of claim 14, wherein the first message comprises a cellular BSR, and wherein the programming includes instructions to cancel all pending cellular BSRs in accordance with upon receiving the D2D resource grant.

16. The user device of claim 14, wherein the programming includes instructions to select a preamble out of a plurality of preambles reserved for random access, transmit the preamble to the communications controller, and receive a third message including information regarding an uplink resource grant scheduled for the user device by the communications controller.

17. The user device of claim 16, wherein the programming includes instructions to transmit the first message in an uplink resource in accordance with the uplink resource grant.

18. The user device of claim 14, wherein the programming includes instructions to transmit one of a fourth message and data to a receiving user device in a D2D resource in accordance with the information regarding the D2D resource grant.

19. The user device of claim 14, wherein the user device is a user equipment (UE) and the communications controller is an evolved NodeB (eNB) in a Third Generation Partnership Project Long Term Evolution compliant communications system.

20. A communications controller configured for device-to-device (D2D) communications, the communications controller comprising:
a processor; and
a computer readable storage medium storing programming for execution by the processor, the programming including instructions to:
receive a first message including a proximity services (ProSe) buffer status report (BSR) from a first user device, the first message being received in an uplink resource that is granted by the communications controller in response to a preamble received from the first user device during a random access procedure initiated by the first user device, the ProSe BSR being one of a plurality of pending ProSe BSRs, and each of the plurality of pending ProSe BSRs indicating an amount of data stored in a buffer of the first user device that is available for the first user device to directly transmit to a second user device in D2D transmission;
schedule a D2D resource for the first user device to transmit to a second user device in response to receipt of the ProSe BSR; and
transmit a second message including information regarding the D2D resource to the first user device, wherein the second message is configured to prompt the first user device to cancel all pending ProSe BSRs and to indicate to the first user device that a contention resolution process of the random access procedure is completed.

21. The communications controller of claim 20, wherein the first message further comprises a cellular BSR, and wherein the programming includes instructions to schedule an uplink resource for the first user device to transmit to the communications controller, and wherein the programming includes instructions to schedule the D2D resource for the first user device to transmit to the second user device, wherein the second message further comprises information regarding one of the uplink resource and the D2D resource to the first user device, and wherein the second message is configured to prompt the first user device to cancel all pending cellular BSRs and all pending ProSe BSRs.

22. The communications controller of claim 20, wherein the first message further comprises a periodic cellular BSR, and wherein the programming includes instructions to schedule uplink resources periodically for the first user device to transmit to the communications controller, and wherein the programming includes instructions to schedule the D2D resource for the first user device to transmit to the second user device wherein the second message includes information regarding the D2D resource to the first user device, and wherein the second message is configured to prompt the first user device to cancel all pending ProSe BSRs.

23. The communications controller of claim 20, wherein the first message further comprises a padding cellular BSR, wherein the programming includes instructions to schedule the D2D resource for the first user device to transmit to the second user device, wherein the second message includes information regarding the D2D resource to the first user device, and wherein the second message is configured to prompt the first user device to cancel all pending ProSe BSRs.

24. The communications controller of claim 20, wherein the programming includes instructions to receive a preamble out of a plurality of preambles reserved for random access from the first user device, schedule an uplink resource for the first user device to transmit the ProSe BSR to the communications controller, and transmit a third message including information regarding the uplink resource to the first user device.

\* \* \* \* \*